United States Patent
Schuster

[15] 3,661,433
[45] May 9, 1972

[54] SELF-ALIGNING BEARING
[72] Inventor: John R. Schuster, Elyria, Ohio
[73] Assignee: The General Industries Company, Elyria, Ohio
[22] Filed: Jan. 19, 1970
[21] Appl. No.: 4,000

[52] U.S. Cl. ................................................308/72
[51] Int. Cl. ...............................................F16c 9/06
[58] Field of Search ...................308/72, 140, 29, 194

[56] References Cited

UNITED STATES PATENTS

| 2,621,088 | 12/1952 | Cole | 308/72 |
| 2,886,380 | 5/1959 | Lambeek | 308/72 |
| 3,007,747 | 11/1961 | Isler | 308/72 |
| 3,302,048 | 1/1967 | Gray | 308/72 |
| 3,317,256 | 5/1967 | Ernest | 308/72 |
| 3,342,513 | 9/1967 | Melton et al | 308/72 |

FOREIGN PATENTS OR APPLICATIONS

| 962,397 | 6/1950 | France | 3.8/72 |
| 779,419 | 7/1957 | Great Britain | 308/72 |

*Primary Examiner*—Martin P. Schwadron
*Assistant Examiner*—Ronald H. Lazarus
*Attorney*—J. H. Slough

[57] ABSTRACT

There is disclosed herein a self-aligning bearing for electric motors and the like which embodies a spherical bearing member mounted for universal movement and having an axial opening to accomodate the motor shaft, the bearing having lubricating return grooves across the axially directed ends thereof, said grooves extending partway into the spherical side surface portions of the bearing.

5 Claims, 6 Drawing Figures

PATENTED MAY 9 1972  3,661,433

INVENTOR.
John R. Schuster
BY
J. H. SLOUGH
ATTORNEY

SELF-ALIGNING BEARING

My invention relates to bearings and relates particularly to self-aligning bearings.

In the bearing assembly herein disclosed, the bearing is enclosed by an annular wick and is provided with improved lubricating channels for the return of oil flowing in a direction toward an end of the shaft thereby preventing the same from being thrown radially thereof.

An object of my invention is to provide a self-aligning bearing assembly for small fractional horsepower motors; for example, fan motors of the type wherein the bearing has an aperture in which the motor shaft is journaled and said bearing is supported on one side by a bearing casing or bracket and on the opposite side by a spring bearing seat backed up by a retainer plate.

A further object of my invention is to provide increased oil capacity in the bearing casing.

A still further object of my invention is to provide improved oil return means for a self-aligning bearing.

Other objects of my invention and the invention itself will become more readily apparent by reference to the accompanying specification and appended drawings, in which drawings.

Figure 1:
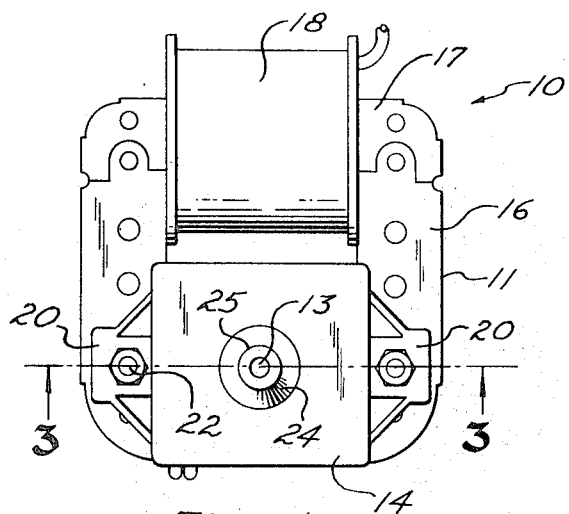
FIG. 1 is a top plan view of a motor incorporating the improved self-aligning bearing of my invention.
Figure 2:
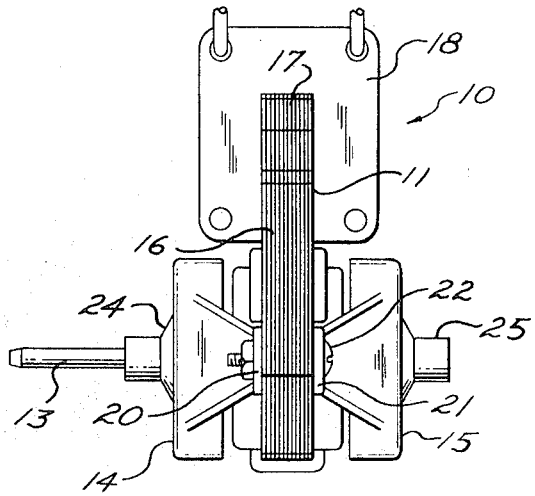
FIG. 2 is a side plan view of the motor of FIG. 1.

Referring now to the drawings in all of which like parts are designated by like reference numerals, the bearing structure embodying the features of this invention is shown in the drawings as applied to an electric motor to support the armature shaft thereof, but obviously this bearing structure need not be limited to such use.

Figure 3:
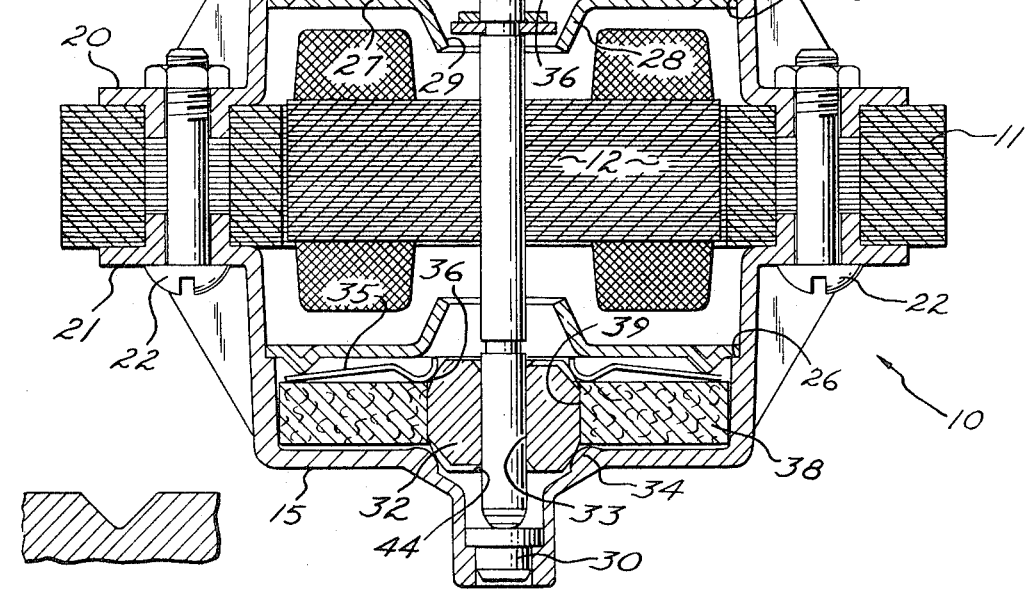
FIG. 3 is a diametrically enlarged cross section taken on the line 3—3 of FIG. 1.

In the embodiment as herein disclosed, an electric motor 10 comprises a laminated stator 11, a rotor 12 mounted to a rotor shaft 13, and a pair of rectangular, nearly square bearing brackets 14 and 15 disposed at the upper and lower ends, respectively, of the motor as shown in FIG. 3. The stator 11 has a pair of laterally projecting arms 16 connected at their distal ends by a core assembly 17 surrounded by a field inducing coil 18. The bearing brackets 14 and 15 are provided with laterally projecting mounting portions 20 and 21, respectively, disposed on either side of the laminated stator 11, and bolt and nut assemblies 22 project through suitably aligned openings in the stator and bracket mounting portions to form a housing for the rotor 12.

The bearing brackets 14 and 15 are substantially identical, each providing an inner, rectangular cavity 23 and having an outwardly frustoconical neck 24 terminating in an outwardly projecting collar 25. A shoulder 26 disposed inwardly of each cavity 23 provides a seat for a rigidly fixed retainer 27 having an inwardly directed, frustoconical central neck 28 affording an opening 29 therethrough. The rotor shaft 13 projects in either direction through the openings 29, the cavities 30, and into the collars 25, the upper end of said shaft projecting outwardly beyond the collar on the upper bearing bracket 14 and the lower end of said shaft seating on a thrust button 30 mounted within the collar 25 of the lower bearing bracket 15.

The shaft 13 is supported at either end by a spherical type bearing 32 having a central bore 33 adapted to rotatably receive said shaft. Each bearing 32 is seated at its outer end against an annular protrusion 34 of the associated bearing bracket and at its inner end against a spring 35 having an annular seat 36. As herein illustrated, a lubricant supplying medium such as a square, oil-permeable wick 38 of felt or similar material is seated within each cavity 23, each wick having a central opening 39 of circular form whereby the wick closely surrounds the associated bearing 32. It will be understood that the wick 38 is saturated with a suitable lubricating oil whereby the bearing is adequately and continuously lubricated. It will be further understood that other known lubrication means may be used in the cavity, such as a blend of cellulose fibers and oil or a compound of self-lubricating polymers and oil, such lubricant supplying means being commercially available and given by way of example only.

Figure 4:
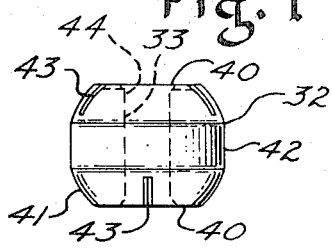
FIG. 4 is a side elevation of the bearing of FIG. 3, the grooves being shown in solid and dotted lines.
Figure 5:
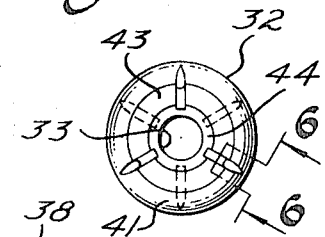
FIG. 5 is a top plan view of the bearing of FIG. 4.
Figure 6:
FIG. 6 is an enlarged sectional detail taken along the line 6—6 of FIG. 5 showing the groove configuration.

Referring now particularly to FIGS. 4–6, each bearing 32 is provided with transverse flat end surface portions 40, spherical contacting surface portions 41 disposed adjacent to the end portions 40, and an intermediate, substantially cylindrical surface portion 42 centered in an axial direction between the contacting portions 41. The contacting portions 41 of each bearing are adapted to bear against an annular protrusion 34 and an annular seat 36 with the cylindrical portion 42 contacting and being wiped by the wick 38 at the central opening 39 of said wick.

Each bearing 32 is provided with a plurality of radiating, lubricating grooves 43 which extend from the bore 33 across the transverse flat end surface portions 40 and into the spherical contacting portions to points adjacent to the intermediate surface portion 42. FIG. 6 shows the general, V-shaped cross sectional configuration of the grooves, said configuration being substantially uniform throughout their lengths but tapering slightly at their outer ends into convergence with the contacting surface portions 41. As herein illustrated and best seen in FIG. 5, the bearing 32 is provided with three such circumferentially evenly spaced, radiating grooves 43 at each axially directed end of the bearing, the grooves at one end of said bearing being offset substantially 60° with respect to the grooves at the other end of said bearing; that is, one-half the arcuate distance between two adjacent grooves.

The bearings 32 are preferably made of a porous, lubricant-impregnable material such as a sintered bronze. The oil-saturated wick 38 will thus keep the bearing 32 impregnated with oil which will in turn lubricate the shaft 13 as it rotates within said bearings.

During rotation of the rotor shaft 13, which rotation is generally at substantially high speeds, oil from the bearings 32 tends to accumulate on said shaft and flow towards either end thereof away from that portion of the shaft intended to be lubricated. The grooves 43 provide continuous return channels or routes for the oil or lubricant which, when it reaches the ends of the bore 33 of the bearing, will, by centrifugal force, be caused to flow outwardly along the grooves by means of which it will be returned to the wick 38. This gathering and return flow of the lubricant may be further improved by providing inner bevels 44 at the ends of the bore 33 in communication with the radiating grooves 43. Thus, a continuous lubrication and return flow system is set up when the motor shaft is in motion which preserves the lubricant and prevents its moving along the shaft to other parts of the motor.

The square shape of the wick 38 provides a substantially larger oil capacity than that found in ordinary annular wicks, which further tends to increase the efficiency of the overall lubricating system as disclosed herein.

It will be understood that many changes in the details of the invention as herein described and illustrated may be made without, however, departing from the spirit thereof or the scope of the appended claims.

I claim:

1. A self-aligning bearing for fractional horsepower motors, the bearing having an axial bore for receiving a motor shaft for rotation therein; said bearing being made of a porous lubricant impregnable material and having transverse end surface portions surrounding said bore, spherical surface portions adjacent to said end surface portions, and a circumferential intermediate surface portion between said spherical portions adapted to be wiped by a liquid lubricant supplying medium; which will keep the bearing impregnated with lubricant and, in turn the bearing will lubricate said motor shaft means defining a plurality of radiating grooves in said transverse end surface portions and said spherical surface portions, said grooves extending outwardly into said spherical surface portions to points adjacent to said intermediate surface portion whereby liquid lubricant return channels are provided for returning liquid lubricant from each end of the bearing back to the lubricant supply medium.

2. A self-aligning bearing as set forth in claim 1: said grooves being circumferentially evenly spaced and of the same number at both ends of said bearing; the grooves at one end of said bearing being arcuately offset with respect to the grooves at the opposite end of said bearing a distance equal to one-half the arcuate distance between two adjacent grooves.

3. A self-aligning bearing as set forth in claim 2: there being three of said radiating grooves at each end of said bearing.

4. A self-aligning bearing assembly comprising a housing; an oil supplying medium disposed in said housing, and having a central opening; a self-aligning bearing having an axial bore, said bearing being made of a porous lubricant impregnable material and disposed within said opening coaxially therewith whereby said medium contacts an intermediate, circumferential outer surface portion of said bearing in order to provide lubricant for said porous bearing which, in turn, provides lubricant for a rotatable shaft projecting through said bore; said bearing having spherical surface portions; annular seating means carried by said housing seating said spherical surface portions at either end of said bearing; means defining a plurality of radiating grooves in said transverse end surface portions and spherical surface portions, to points adjacent to said intermediate surface portion to provide oil return channels for oil to flow from said shaft adjacent to the ends of each bearing back to said medium.

5. A self-aligning bearing assembly as set forth in claim 4: said medium being rectangular and said housing providing a rectangular cavity in which said medium is seated.

* * * * *